United States Patent
Sen et al.

(10) Patent No.: US 11,569,721 B2
(45) Date of Patent: Jan. 31, 2023

(54) HAPTIC ACTUATOR INCLUDING PERMANENT MAGNET WITHIN COIL PASSAGEWAYS WHEN UNPOWERED AND RELATED METHODS

(71) Applicant: Apple Inc., Cupertino, CA (US)

(72) Inventors: Yi-Heng Sen, San Jose, CA (US); Alex M. Lee, Sunnyvale, CA (US); Alex J. Speltz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 347 days.

(21) Appl. No.: 16/426,614

(22) Filed: May 30, 2019

(65) Prior Publication Data
US 2020/0381988 A1    Dec. 3, 2020

(51) Int. Cl.
*H02K 33/18* (2006.01)
*G08B 6/00* (2006.01)
*H02K 35/02* (2006.01)

(52) U.S. Cl.
CPC ............... *H02K 33/18* (2013.01); *G08B 6/00* (2013.01); *H02K 35/02* (2013.01)

(58) Field of Classification Search
CPC ........... G08B 6/00; H02K 33/18; H02K 33/12
See application file for complete search history.

(56) References Cited

U.S. PATENT DOCUMENTS 5,896,076 A * 4/1999 van Namen .......... H01F 7/1615
                                                                335/229
8,169,402 B2    5/2012 Shahoian et al.
8,575,794 B2 * 11/2013 Lee ........................ H02K 33/18
                                                                310/30
2013/0169071 A1 * 7/2013 Endo ...................... H02K 33/12
                                                                310/25
2014/0197936 A1    7/2014 Biggs et al.
2015/0109223 A1    4/2015 Kessler et al.
(Continued)

FOREIGN PATENT DOCUMENTS

WO    2013169299 A1    11/2013
WO    2013169303 A1    11/2013
(Continued)

OTHER PUBLICATIONS

Product Specification Sheet: Geeplus, VIBRO1 Vibration Actuator, 2 pages, www.geeplus.biz, downloaded on Jul. 15, 2015.

*Primary Examiner* — Bernard Rojas
(74) *Attorney, Agent, or Firm* — Brownstein Hyatt Farber Schreck, LLP

(57) ABSTRACT

A haptic actuator may include a housing having opposing first and second ends and first and second coils carried by the housing adjacent respective first and second ends thereof. Each coil may have a respective passageway therethrough. The actuator may include a field member including first and second masses adjacent respective first and second ends of the housing, and a permanent magnet having first and second ends coupled to respective ones of the first and second masses. The actuator may also include first and second flexures mounting respective first and second masses to the respective first and second ends of the housing so that the field member is reciprocally movable within the passageways of the coils responsive to powering the coils and so that the ends of the permanent magnet are within respective passageways of the coils when the coils are unpowered.

16 Claims, 8 Drawing Sheets

(56) References Cited

U.S. PATENT DOCUMENTS

| | | |
|---|---|---|
| 2015/0116205 A1 | 4/2015 | Westerman et al. |
| 2015/0130730 A1 | 5/2015 | Harley et al. |
| 2018/0059793 A1* | 3/2018 | Hajati .................... H02K 33/02 |
| 2018/0281020 A1* | 10/2018 | Katada ................... H02K 33/16 |
| 2020/0067394 A1* | 2/2020 | Ishikawa .................. H02K 1/34 |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

HAPTIC ACTUATOR INCLUDING PERMANENT MAGNET WITHIN COIL PASSAGEWAYS WHEN UNPOWERED AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing having opposing first and second ends and first and second coils carried by the housing adjacent respective first and second ends thereof. Each coil may have a respective passageway therethrough. The haptic actuator may include a field member having first and second masses adjacent respective first and second ends of the housing, and a permanent magnet having first and second ends coupled to respective ones of the first and second masses. The haptic actuator may also include first and second flexures mounting respective first and second masses to the respective first and second ends of the housing so that the field member is reciprocally movable within the passageways of the first and second coils responsive to powering the first and second coils and so that the first and second ends of the permanent magnet are within respective passageways of the first and second coils when the first and second coils are unpowered.

Each of the respective passageways may have a width associated therewith, and the first and second ends of the permanent magnet may be aligned within an inner half of the width when the first and second coils are unpowered, for example. The first and second ends of the permanent magnet may be aligned within an inner third of the width when the first and second coils are unpowered, for example.

The permanent magnet may have a planar shape. The permanent magnet may have a dog bone shape with enlarged first and second ends.

Each of the first and second flexures may include two diverging arms joined together at proximal ends and having spaced distal ends operatively coupled between adjacent portions of the field member and the housing, for example. The first and second masses each may include non-ferromagnetic material. The first and second masses may each include tungsten, for example. The housing may include ferromagnetic material, for example.

A method aspect is directed to method of making a haptic actuator. The method may include mounting first and second coils to a housing adjacent respective first and second ends thereof. Each coil may have a respective passageway therethrough. The method may further include using first and second flexures to mount respective first and second masses to the respective first and second ends of the housing with a permanent magnet coupled between the first and second masses so that the field member is reciprocally movable within the passageways of the first and second coils responsive to powering the first and second coils and so that the first and second ends of the permanent magnet are within respective passageways of the first and second coils when the first and second coils are unpowered.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
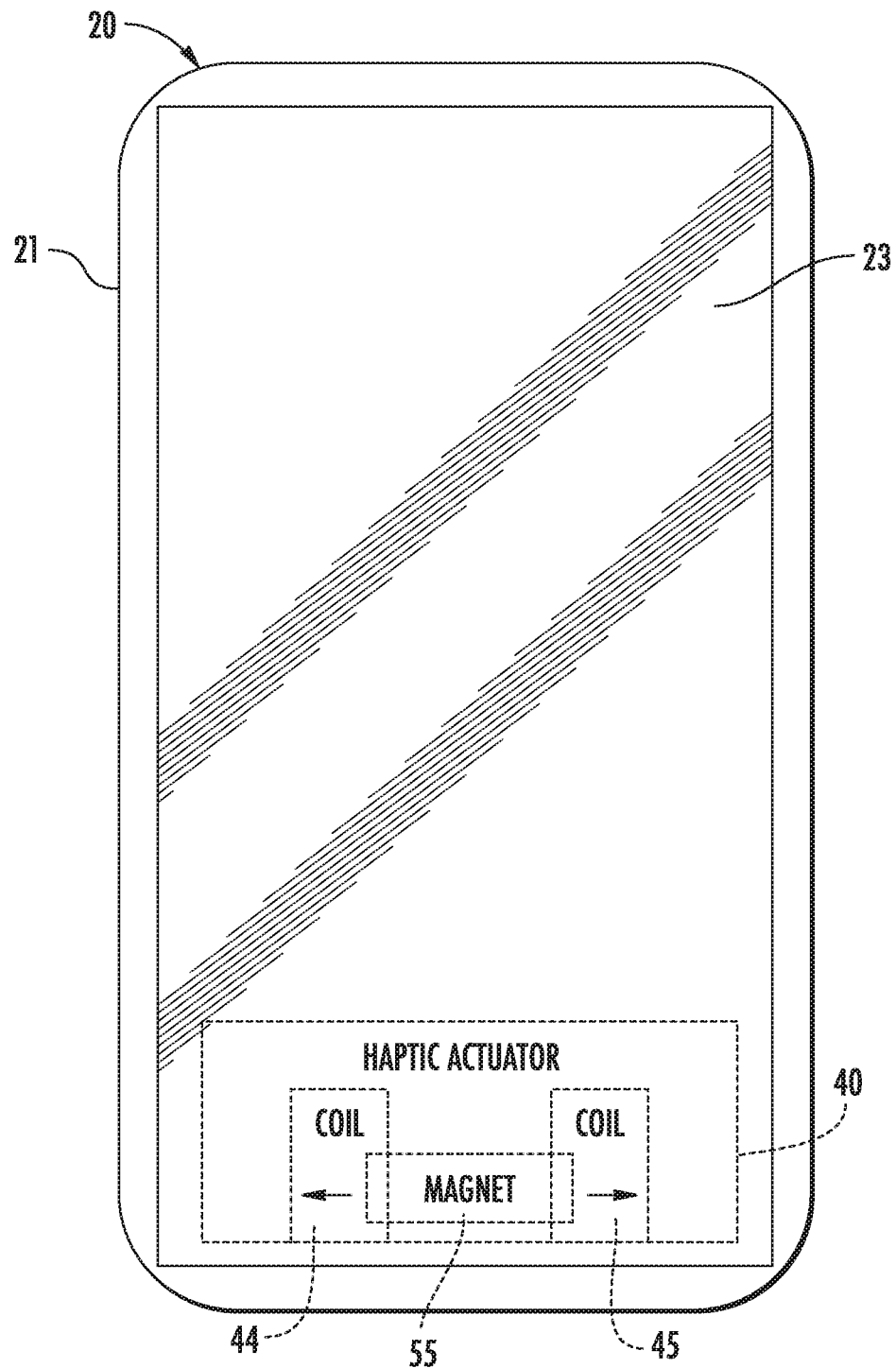
FIG. 1 is a schematic diagram of an electronic device including a haptic actuator in accordance with an embodiment.
Figure 2:
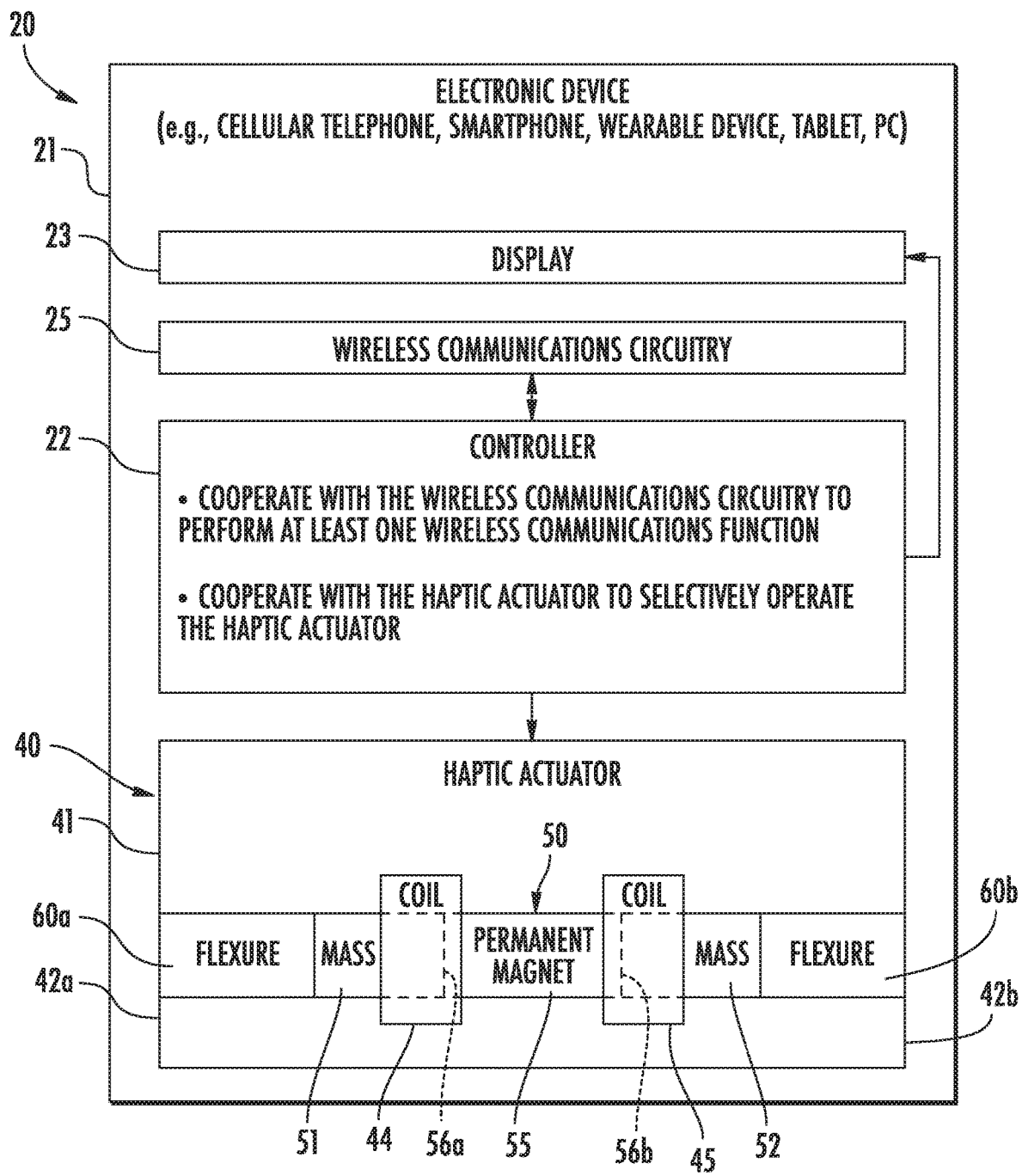
FIG. 2 is a schematic block diagram of the electronic device of FIG. 1.

Referring initially to FIGS. 1-2, an electronic device 20 illustratively includes a device housing 21 and a controller 22 carried by the device housing. The electronic device 20 is illustratively a mobile wireless communications device, for example, a cellular telephone or smartphone. The electronic device 20 may be another type of electronic device, for example, a wearable device (e.g., a watch), a tablet computer, a laptop computer, a gaming device, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a light emitting diode (LED) display, a liquid crystal display (LCD), or may be another type of display, as will be appreciated by those skilled in the art. The display 23 may be a touch display and may cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback or a haptic effect to the user in the form of relatively long and short vibrations. The vibrations may be indicative of a message received, and the duration and type of the vibration may be indicative of the type of message received. Of course, the vibrations may be indicative of or convey other types of information.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

Figure 3:
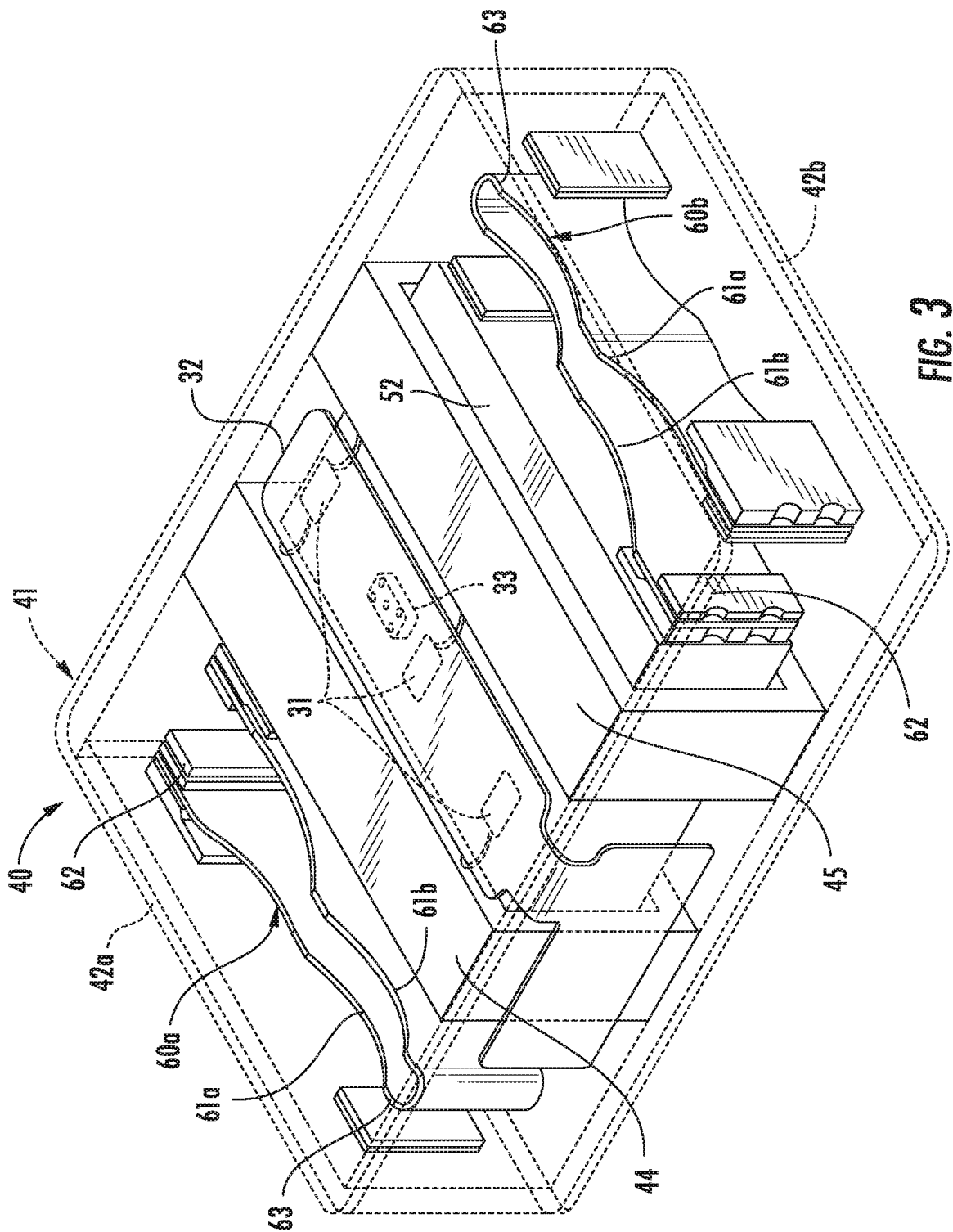
FIG. 3 is a perspective view of a portion of a haptic actuator in accordance with an embodiment.
Figure 4:
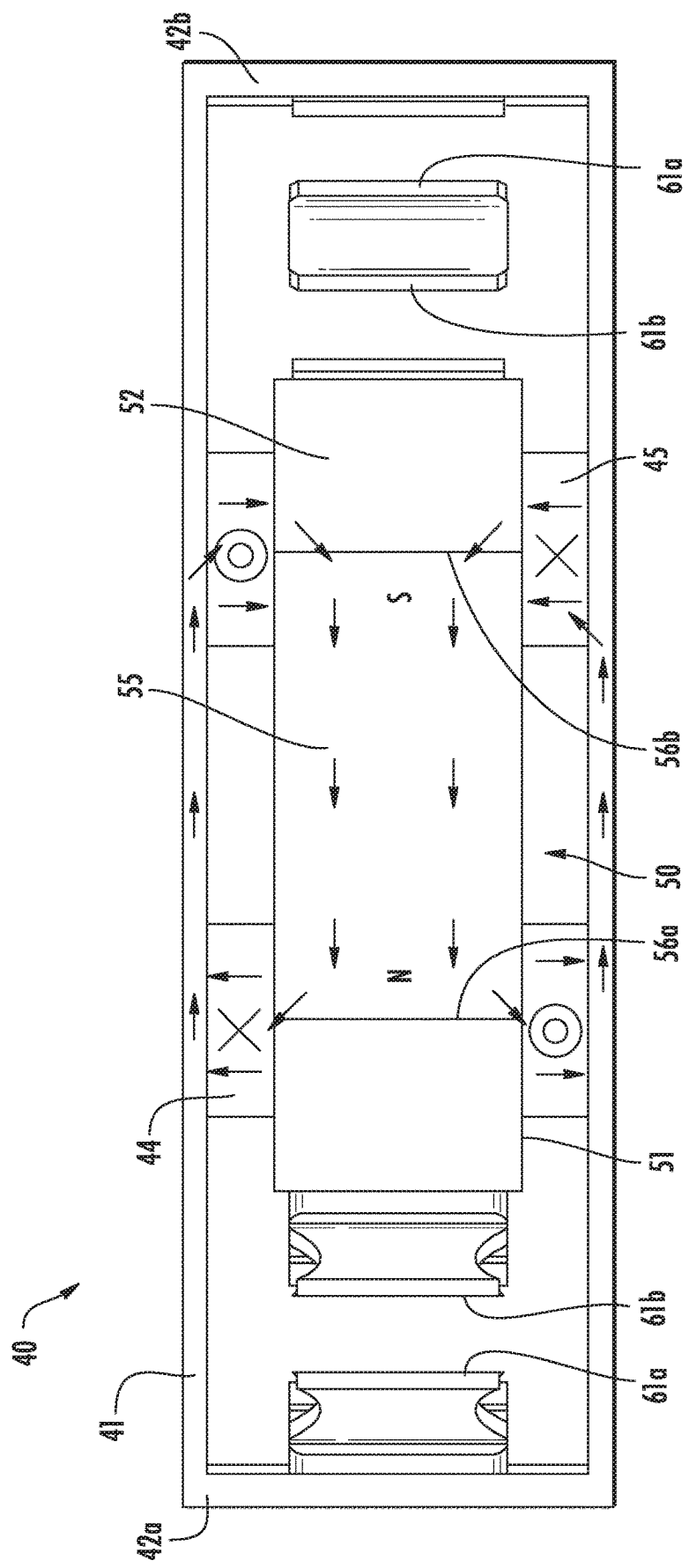
FIG. 4 is a side cross-sectional view of a portion of a haptic actuator in accordance with an embodiment.
Figure 5:
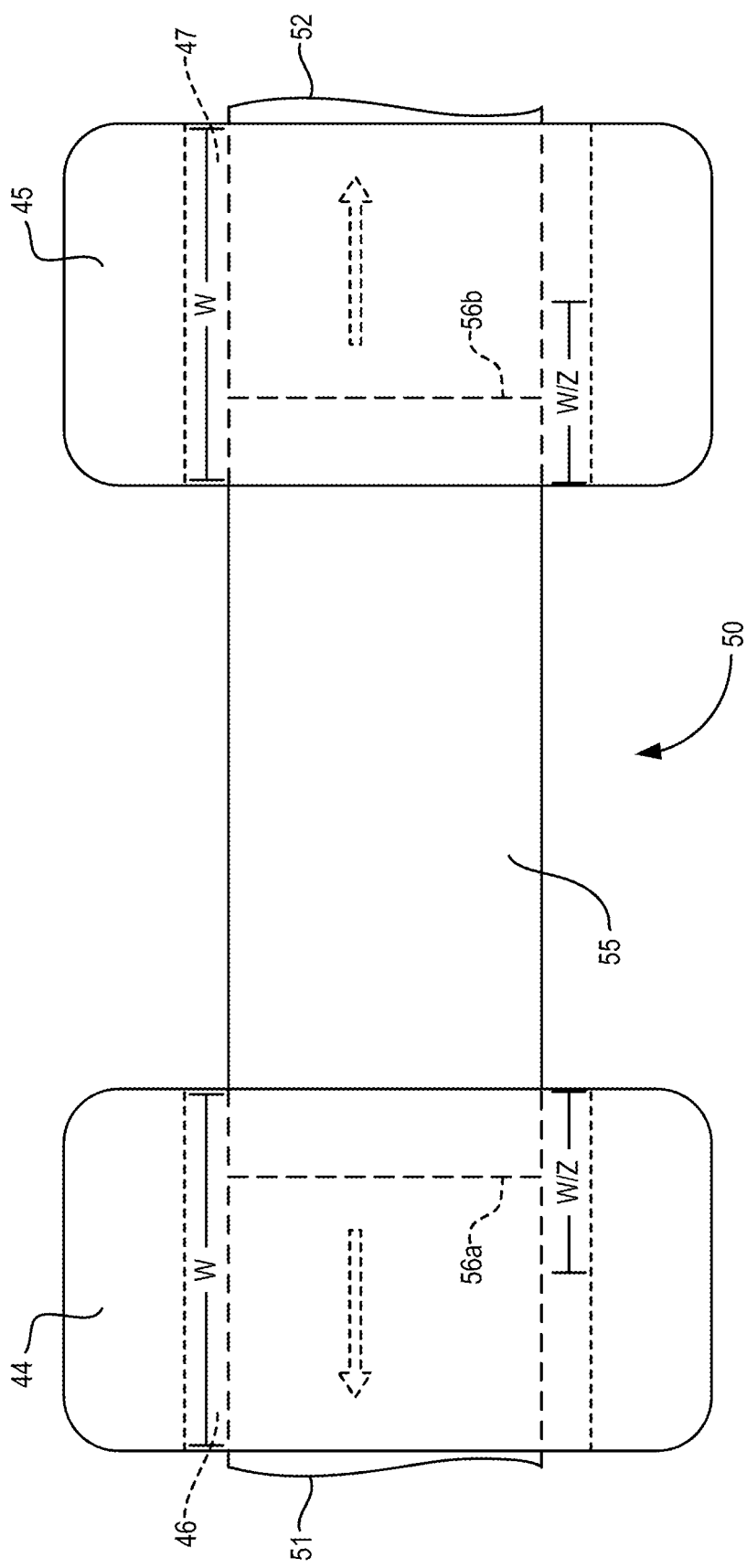
FIG. 5 is a schematic side view of a portion of a haptic actuator in accordance with an embodiment.

Referring now additionally to FIGS. 3-5, the haptic actuator 40 includes an actuator housing 41 having opposing first and second ends 42a, 42b. The actuator housing 41 may include ferromagnetic material, for example. The actuator housing 41 may include other and/or additional materials.

The haptic actuator 40 also includes first and second coils 44, 45 carried by the actuator housing 41 adjacent respective first and second ends thereof 42a, 42b. Each coil 44, 45 has a respective passageway therethrough. In other words, the coils 44, 45 may be considered wrap-around coils. The coils 44, 45 may be electrically connected at the top of the actuator housing 41, for example, by way of contact pads 31 carried by a flexible substrate 32 (FIG. 3). Control or drive circuitry 33, which may be part of the controller 22 may also be carried by the flexible substrate 32.

The haptic actuator 40 also includes a field member 50 that includes first and second masses 51, 52. The masses 51, 52 are adjacent respective first and second ends 42a, 42b of the actuator housing 41. The masses 51, 52 may be non-ferromagnetic material, for example, a relatively heavy material, such as, tungsten.

The field member 50 also includes a permanent magnet 55 that has first and second ends 56a, 56b. The first and second ends 56a, 56b of the permanent magnet 55 are coupled to respective ones of the first and second masses 51, 52. The permanent magnet 55 may have a planar shape, and the permanent magnet and the end coupled first and second masses 51, 52 together have a rectangular shape.

First and second flexures 60a, 60b mount respective masses 51, 52 to the respective first and second ends 42a, 42b of the actuator housing 41. The first and second flexures 60a, 60b each include two diverging arms 61a, 61b joined together at proximal ends (e.g., at a bend 63). The two diverging arms 61a, 61b have spaced apart distal ends that are operatively coupled between adjacent portions of the field member 50 and the actuator housing 41. Stops 62 may be carried by inner portions of the spaced apart distal ends. While a particular arrangement with respect to flexures is described, those skilled in the art will appreciate that other flexure arrangements may be used.

The flexures 60a, 60b are mounted so that the field member 50 is reciprocally movable within the passageways 46, 47 of the first and second coils 44, 45 and so that the first and second ends 56a, 56b of the permanent magnet 55 are within respective passageways of the coils when the coils are unpowered.

More particularly, the passageways 46, 47 in the coils 44, 45 each have a width W associated therewith. The widths may be the same as the width of each coil 44, 45. The first and second ends 56a, 56b of the permanent magnet 55 are aligned within an inner half of the width when the coils 44, 45 are unpowered. The inner half of the width corresponds to half the portion of the passageway 46, 47 that is closest to the field member 50 or permanent magnet 55, as opposed to the ends 42a, 42b of the actuator housing 41. In some embodiments, the first and second ends 56a, 56b of the permanent magnet 55 are aligned within an inner third, and more particularly, an inner sixth, of the width when the coils 44, 45 are unpowered.

The positioning and relative location of the permanent magnet 55 relative to the coils 44, 45 may be advantageous for increased efficiency haptic operations and use of space with respect to prior approaches. Moreover, since the coils 44, 45 are near the end of field member 50, each coil additionally functions as a crash stop thereby reducing the chances of the flexure hitting the top or bottom of the actuator housing 41.

With respect to the magnetic fields, the magnetic flux emanates from one side of the permanent magnet 55, through the coils 44, 45, and returns back to the permanent magnet from the opposite side from which the magnetic flux emanated. The directional magnetic flux lines are illustrated in FIG. 4 by arrows, and, with respect to FIG. 4, an "X" indicates the magnetic field lines being directed "into" the coils 44, 45, while a circle indicates magnetic field lines being directed "out of" the coils.

One particular advantage of the haptic actuator 40 described herein is the engine or actuator force/unit volume when the corresponding box or actuator housing 41 has a relatively small dimension in X, Y, or Z-axes. With prior approaches, when the engine or actuator size is reduced in the x-axis direction, such a decrease directly impacts the width of the coil and the travel distance. The relatively small x-axis dimension of the present haptic actuator 40 may be more tolerant as the coils 44, 45 do not waste space at or near their curved or rounded portions. The reduction in size is balanced between sizing of the masses 51, 52 (e.g., tungsten masses) and the length of the permanent magnet 55 (in the x-axis direction).

Additionally, in prior approaches of a haptic actuator, when the size of the haptic actuator is reduced in the y-axis direction, the aspect ratio of the coil makes the haptic actuator or engine far less efficient. With respect to the haptic actuator 40 described herein, a reduction in the y-axis direction can be compensated with adjustments in the x-axis and z-axis dimensions.

Still further, a haptic actuator of prior approaches is reduced in size in the z-axis direction, the magnetic flux will typically be significantly reduced, thus affecting the engine or actuation force. With respect to the present haptic actuator 40, since the permanent magnet 55 is oriented in the x-axis direction, such a decrease may be compensated by other two (i.e., x-axis and y-axis) dimensions.

To demonstrate the advantage of salience under a relatively extremely small dimension, a simulation was performed using two haptic actuator architectures: a prior haptic actuator approach and the haptic actuator 40 described herein. The actuator housing 41 had simulated dimensions (X, Y, Z) of 15.5 mm×11.05 mm×4.5 mm, compared a prior haptic actuator having dimensions of 20.1 mm×11.05 mm×4.5 mm. Indeed, the haptic actuator 40 for this simulation is significantly smaller in x-axis dimension. Such reduction in x-axis dimension results in a direct cutback on coil and magnet size, i.e., the active portion for engine or actuation force. For example, when using a typical race-track architecture, the engine force=0.303 N/Watt.

Under the same dimensional constraint but with the present haptic actuator 40 architecture, the engine force=0.338 N per Watt. Such engine or actuation force increase from the present haptic actuator 40 enables the possibility of shrinking dimensions of the haptic actuator without sacrificing any or a relatively significant portion of its salience performance. When the field member 50 is at a center position, for example, at equilibrium, the magnetic flux intersects with every portion of the coils 44, 45 as opposed to the prior approaches where only a middle straight portion makes contribution to the actuation force. Indeed, based upon the simulations, efficiency improved by >12%.

Figure 6:
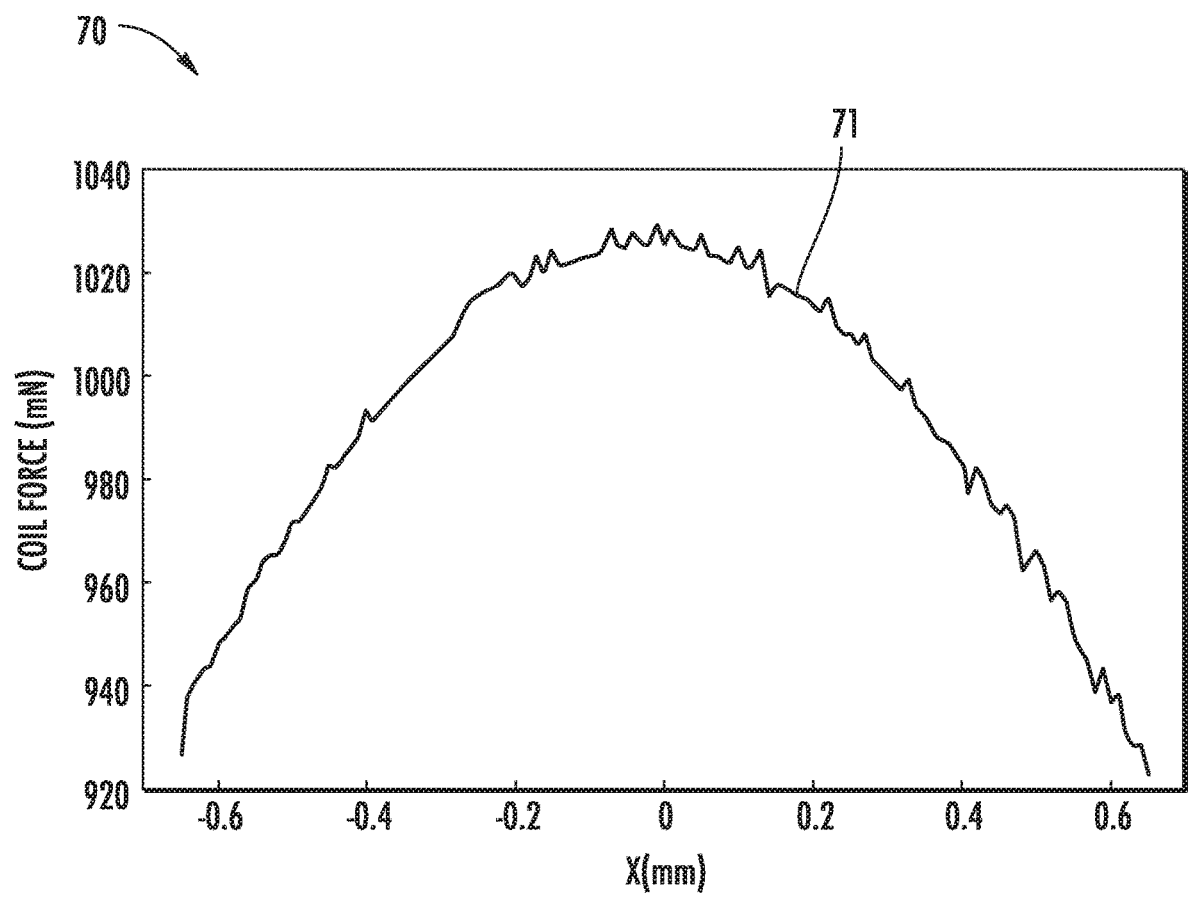
FIG. 6 is a graph of actuation non-linearity of a prior art haptic actuator.

Yet another advantageous aspect of the present haptic actuator 40 over prior approaches, for example, the racetrack architecture, is the non-linearity of the haptic actuator. Non-linearity quantifies drop in the actuation force when the magnets move away from the center of the coil during vibration. As a result, under the same power, the salience drops. Besides, such non-linearity adds additional difficulties for closed-loop control, and therefore causes other secondary effects, for example, undesirable acoustics. The graph 70 in FIG. 6, illustrates the typical engine non-linearity profile of a race-track based haptic actuator. Illustratively, the actuation or engine force 71 drops quadratically as the force from each coil drops quadratically altogether due to all the coils moving away from the center of mass.

Figure 7:
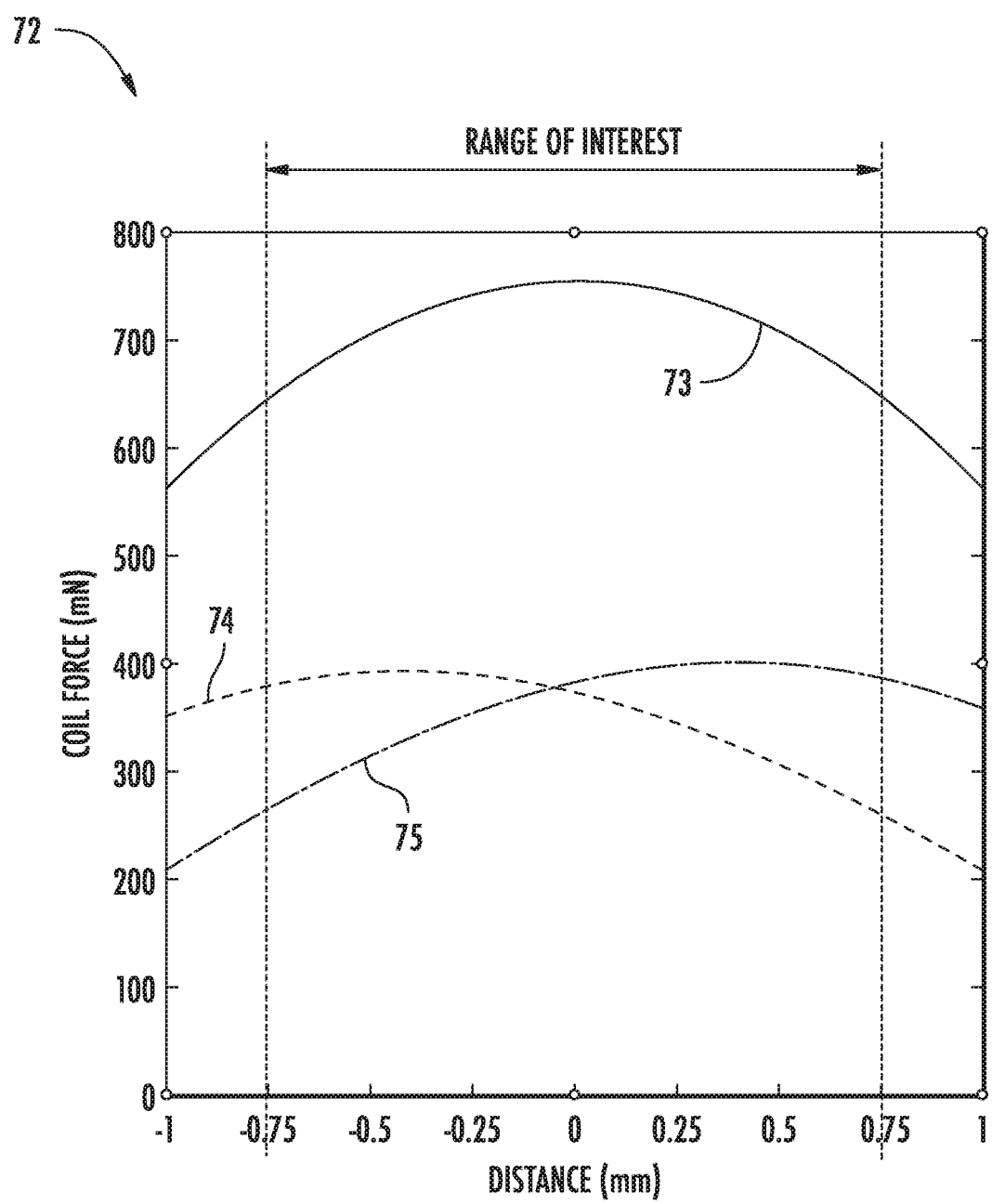
FIG. 7 is a graph of actuation non-linearity of a haptic actuator in accordance with an embodiment.

Referring to the graph 72 in FIG. 7, the present haptic actuator 40 illustrates different engine or actuation force drops, and more particularly, the total force 73, the left coil force 74, and right coil force 75 over varying distances from center or equilibrium, and more particularly, along an exemplary range of interest. When the permanent magnet 55 and masses 51, 52 (i.e., the field member 50, shown in FIGS. 4 and 5) move away from their central positions, while the combined engine force still drops quadratically, when looking at the two coils 44, 45 separately, the Lorentz forces increase from one coil while the Lorentz forces from the other coil decrease. In other words, with respect to the present haptic actuator 40, when the coils 44, 45 are actuated separately, the non-linearity may be improved to potentially have a relatively constant engine force across the entire travel range.

Figure 8:
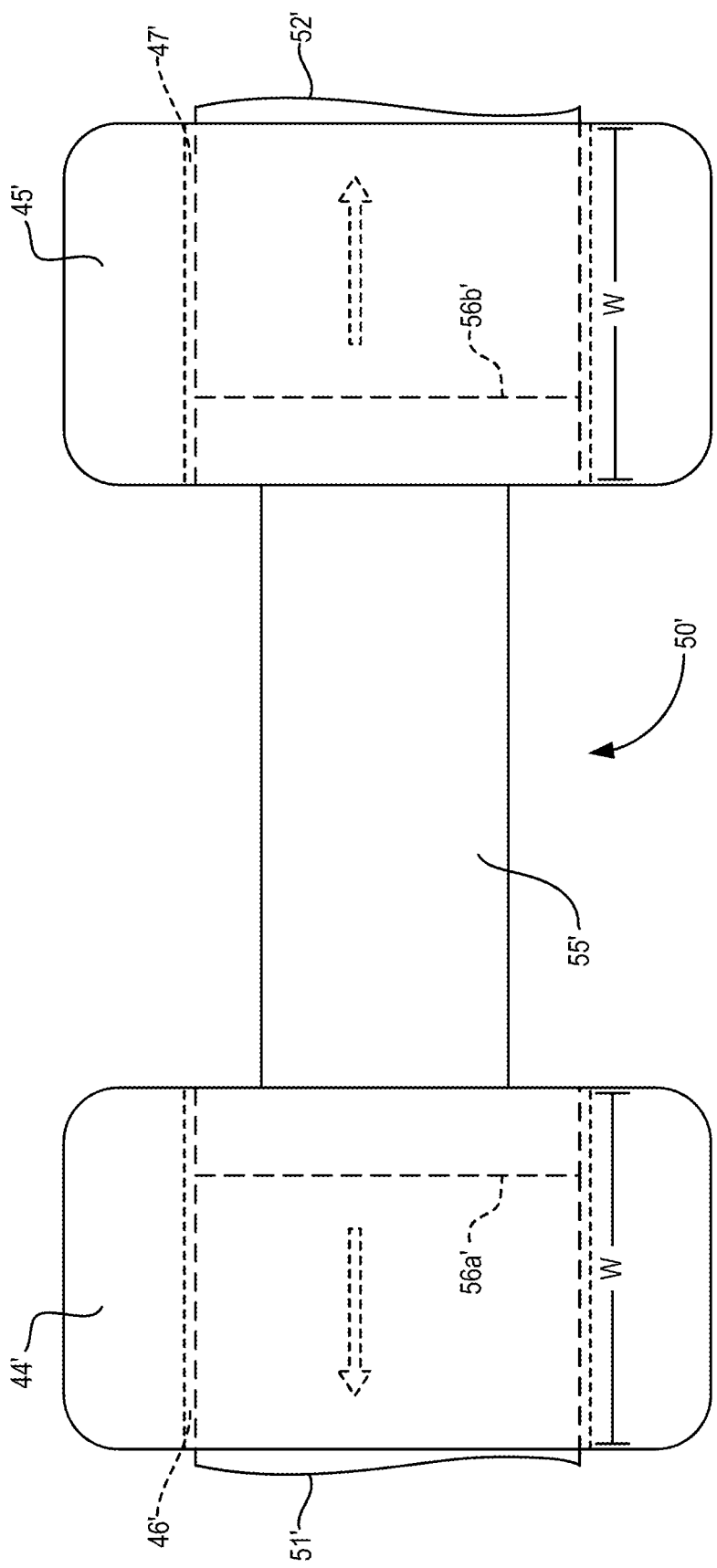
FIG. 8 is a schematic side view of a portion of a haptic actuator in accordance with another embodiment.

Referring now to FIG. 8, in another embodiment, the spacing between adjacent portions of the permanent magnet 55' and the coils 44', 45' within each passageway 46', 47' is reduced. To achieve the reduced spacing between adjacent portions of the permanent magnet 55' and the coils 44', 45' within each passageway 46', 47', instead of a planar shape, the permanent magnet has a dog bone shape with enlarged first and second ends 56a', 56b'. The masses 51', 52' (which together with permanent magnet 55' form a field member 50') may each have a thickness to match the enlarged first and second ends 56a', 56b', as shown. Alternatively, and not shown, the masses 51', 52' may not have a same thickness as the enlarged first and second ends 56a', 56b'. In some embodiments, to reduce the spacing between adjacent portions of the permanent magnet 55' and the respective coils 44', 45' within each passageway 46', 47', the thickness of the permanent magnet (and thus the masses 51', 52') may be increased.

A method aspect is directed to a method of making a haptic actuator 40. The method may include mounting first and second coils 44, 45 to a housing 41 adjacent respective first and second ends 42a, 42b thereof, wherein each coil has a respective passageway 46, 47 therethrough. The method further includes using first and second flexures 60a, 60b to mount respective first and second masses 51, 52 to the respective first and second ends 42a, 42b of the housing 41 with a permanent magnet 55 coupled between the first and second masses so that the field member 50 is reciprocally movable within the passageways 46, 47 of the first and second coils 44, 45 responsive to powering the first and second coils and so that the first and second ends 56a, 56b of the permanent magnet 55 are within respective passageways of the first and second coils when the first and second coils are unpowered.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A haptic actuator comprising:
   a housing having opposing first and second ends;
   first and second coils carried by the housing adjacent respective first and second ends thereof, each having a respective passageway therethrough;
   a field member comprising first and second masses adjacent respective first and second ends of the housing, and a permanent magnet having enlarged first and second ends coupled to respective ones of the first and second masses; and
   first and second flexures mounting the respective first and second masses to the respective first and second ends of the housing so that the field member is reciprocally movable within the passageways of the first and second coils responsive to powering the first and second coils;
   wherein,
   the enlarged first and second ends of the permanent magnet extend within respective passageways of the first and second coils when the first and second coils are unpowered;
   the enlarged first and second ends of the permanent magnet have a same size cross-section as the first and second masses; and
   the first and second masses are respectively coupled to the enlarged first and second ends of the permanent magnet at positions that are within the respective passageways of the first and second coils when the first and second coils are unpowered.

2. The haptic actuator of claim 1 wherein the couplings of the enlarged first and second ends of the permanent magnet to the respective ones of the first and second masses are aligned within an inner half of the width when the first and second coils are unpowered.

3. The haptic actuator of claim 1 wherein the couplings of the enlarged first and second ends of the permanent magnet to the respective ones of the first and second masses are aligned within an inner third of the width when the first and second coils are unpowered.

4. The haptic actuator of claim 1 wherein each of the first and second flexures comprises two diverging arms joined together at proximal ends and having spaced distal ends operatively coupled between adjacent portions of the field member and the housing.

5. The haptic actuator of claim 1 wherein the first and second masses each comprises non-ferromagnetic material.

6. The haptic actuator of claim 1 wherein the first and second masses each comprises tungsten.

7. The haptic actuator of claim 1 wherein the housing comprises ferromagnetic material.

8. An electronic device comprising:
a device housing;
wireless communications circuitry carried by the device housing;
a haptic actuator comprising
an actuator housing having opposing first and second ends,
first and second coils carried by the actuator housing adjacent respective first and second ends thereof, each having a respective passageway therethrough,
a field member comprising first and second masses adjacent respective first and second ends of the actuator housing, and a permanent magnet having enlarged first and second ends coupled to respective ones of the first and second masses, and
first and second flexures mounting the respective first and second masses to the respective first and second ends of the actuator housing so that the field member is reciprocally movable within the passageways of the first and second coils responsive to powering the first and second coils; wherein,
the enlarged first and second ends of the permanent magnet extend within respective passageways of the first and second coils when the first and second coils are unpowered;
the enlarged first and second ends of the permanent magnet have a same size cross-section as the first and second masses; and
the couplings of the enlarged first and second ends of the permanent magnet to the respective ones of the first and second masses are positioned within the passageways when the first and second coils are unpowered; and
a controller coupled to the wireless communications circuitry and the haptic actuator and configured to perform at least one wireless communications function and selectively operate the haptic actuator, respectively.

9. The electronic device of claim 8 wherein the couplings of the enlarged first and second ends of the permanent magnet to the respective ones of the first and second masses are aligned within an inner half of the width when the first and second coils are unpowered.

10. The electronic device of claim 8 wherein the couplings of the enlarged first and second ends of the permanent magnet to the respective ones of the first and second masses are aligned within an inner third of the width when the first and second coils are unpowered.

11. The electronic device of claim 8 wherein each of the first and second flexures comprises two diverging arms joined together at proximal ends and having spaced distal ends operatively coupled between adjacent portions of the field member and the housing.

12. The electronic device of claim 8 wherein the first and second masses each comprises non-ferromagnetic material.

13. The electronic device of claim 8 wherein the housing comprises ferromagnetic material.

14. A method of making a haptic actuator comprising:
mounting first and second coils to a housing adjacent respective first and second ends thereof, each coil having a respective passageway therethrough, and each passageway having an associated width; and
using first and second flexures to mount respective first and second masses to the respective first and second ends of the housing, with a permanent magnet having enlarged first and second ends coupled between the first and second masses, so that a field member is reciprocally movable within the passageways of the first and second coils responsive to powering the first and second coils, and so that the couplings of the enlarged first and second ends of the permanent magnet to the respective ones of the first and second masses are positioned within the widths of the respective passageways of the first and second coils when the first and second coils are unpowered, the enlarged first and second ends of the permanent magnet having a same size cross-section as the first and second masses.

15. The method of claim 14 wherein the couplings of the enlarged first and second ends of the permanent magnet to the respective ones of the first and second masses are aligned within an inner half of the width when the first and second coils are unpowered.

16. The method of claim 14 wherein the couplings of the enlarged first and second ends of the permanent magnet to the respective ones of the first and second masses are aligned within an inner third of the width when the first and second coils are unpowered.

* * * * *